US011890607B2

(12) United States Patent
Berrebi et al.

(10) Patent No.: US 11,890,607 B2
(45) Date of Patent: Feb. 6, 2024

(54) CERAMIC ARTICLES WITH BLEED-THROUGH BARRIER AND METHODS OF MANUFACTURE THEREOF

(71) Applicant: Corning Incorporated, Corning, NY (US)

(72) Inventors: Mickaël Berrebi, Paris (FR); David Henry, Fontaine le Port (FR)

(73) Assignee: Corning Incorporated, Corning, NY (US)

( * ) Notice: Subject to any disclaimer, the term of this patent is extended or adjusted under 35 U.S.C. 154(b) by 671 days.

(21) Appl. No.: 16/763,200

(22) PCT Filed: Nov. 30, 2018

(86) PCT No.: PCT/US2018/063287
§ 371 (c)(1),
(2) Date: May 11, 2020

(87) PCT Pub. No.: WO2019/108918
PCT Pub. Date: Jun. 6, 2019

(65) Prior Publication Data
US 2020/0298220 A1   Sep. 24, 2020

Related U.S. Application Data

(60) Provisional application No. 62/592,579, filed on Nov. 30, 2017.

(51) Int. Cl.
*B01J 21/12*   (2006.01)
*B01J 35/04*   (2006.01)
(Continued)

(52) U.S. Cl.
CPC ............... *B01J 35/04* (2013.01); *B01J 21/12* (2013.01); *B01J 37/0018* (2013.01);
(Continued)

(58) Field of Classification Search
CPC ........ B01J 21/12; B01J 35/05; B01J 37/0018; B01J 37/0219; B01J 37/0228; B01J 37/0244; B01J 37/082
(Continued)

(56) References Cited

U.S. PATENT DOCUMENTS 4,902,459 A * 2/1990 Matsubara ........ C04B 35/63424
264/670
5,344,799 A * 9/1994 Wu .......................... C03C 10/00
264/43
(Continued)

OTHER PUBLICATIONS

International Search Report of the International Searching Authority; PCT/US2018/063287 dated Mar. 1, 2019; 11 Pages; European Patent Office.

*Primary Examiner* — Cam N. Nguyen
(74) *Attorney, Agent, or Firm* — Joseph M. Homa

(57) ABSTRACT

Methods for limiting bleed-through of aqueous catalyst solutions in ceramic articles are described herein. The methods include applying a hydrophobic cellulose derivative, such as ethylcellulose, to an exterior surface of a fired porous ceramic article. The aqueous catalyst solution is applied to the fired porous ceramic article, such that the hydrophobic cellulose derivative limits bleed-through of the aqueous catalyst solution through at least a portion of the ceramic article. Ceramic articles with skins that limit bleed-through of aqueous catalyst solutions are also described herein.

19 Claims, 7 Drawing Sheets

(51) Int. Cl.
*B01J 37/00* (2006.01)
*B01J 37/02* (2006.01)
*B01J 37/08* (2006.01)

(52) U.S. Cl.
CPC ....... *B01J 37/0219* (2013.01); *B01J 37/0228* (2013.01); *B01J 37/0244* (2013.01); *B01J 37/082* (2013.01)

(58) Field of Classification Search
USPC ........................................................ 502/439
See application file for complete search history.

(56) References Cited

U.S. PATENT DOCUMENTS

| | | | |
|---|---|---|---|
| 5,460,854 A | 10/1995 | Krug | |
| 5,820,967 A * | 10/1998 | Gadkaree | B01J 20/28026 |
| | | | 428/116 |
| 7,132,150 B2 | 11/2006 | Ogunwumi et al. | |
| 7,413,717 B2 * | 8/2008 | Hirai | C04B 38/0009 |
| | | | 422/177 |
| 7,540,898 B2 * | 6/2009 | Oshimi | B01D 46/2474 |
| | | | 55/482 |
| 7,700,163 B2 | 4/2010 | Ingram-Ogunwumi et al. | |
| 7,914,718 B2 * | 3/2011 | Brundage | C04B 38/103 |
| | | | 501/84 |
| 8,101,171 B2 * | 1/2012 | Becard | A01N 65/00 |
| | | | 549/403 |
| 8,133,422 B2 * | 3/2012 | Beauseigneur | C04B 35/6365 |
| | | | 106/162.8 |
| 8,148,297 B2 * | 4/2012 | Backhaus-Ricoult | |
| | | | B01D 46/24492 |
| | | | 502/410 |
| 8,518,333 B2 * | 8/2013 | Ohno | B01D 46/2484 |
| | | | 422/177 |
| 8,518,857 B2 | 8/2013 | Bliss et al. | |
| 8,609,032 B2 * | 12/2013 | Boger | B01D 46/24491 |
| | | | 422/177 |
| 8,623,128 B2 * | 1/2014 | Bayer | B01J 35/04 |
| | | | 106/199.1 |
| 8,641,815 B2 * | 2/2014 | Crume | C04B 35/63444 |
| | | | 501/134 |
| 8,821,624 B2 * | 9/2014 | Niinobe | B28B 3/269 |
| | | | 106/172.1 |
| 8,926,875 B2 * | 1/2015 | Spetseris | B01D 46/2418 |
| | | | 264/43 |
| 8,926,913 B2 | 1/2015 | Henry et al. | |
| 8,932,395 B2 * | 1/2015 | DeRosa | C04B 35/195 |
| | | | 106/172.1 |
| 8,968,639 B2 * | 3/2015 | Bayer | C04B 35/6365 |
| | | | 264/638 |
| 8,979,993 B2 * | 3/2015 | Crume | C04B 35/478 |
| | | | 106/172.1 |
| 9,051,457 B2 * | 6/2015 | DeRosa | C04B 35/478 |
| 9,174,879 B2 * | 11/2015 | DeRosa | C04B 35/6365 |
| 9,221,192 B2 * | 12/2015 | Beall | C04B 35/478 |
| 9,233,880 B2 * | 1/2016 | Lewis | C04B 38/0645 |
| 9,365,702 B2 * | 6/2016 | Bayer | C08L 1/284 |
| 9,580,581 B2 * | 2/2017 | Adden | C08K 3/01 |
| 9,850,171 B2 * | 12/2017 | Lewis | C04B 35/478 |
| 9,856,177 B2 * | 1/2018 | Miao | C04B 35/195 |
| 2003/0022981 A1 | 1/2003 | Baxter et al. | |
| 2005/0261128 A1 | 11/2005 | Hirai | |
| 2009/0035512 A1 * | 2/2009 | Masukawa | F01N 3/2842 |
| | | | 428/116 |
| 2009/0098333 A1 | 4/2009 | Kunieda et al. | |
| 2009/0142488 A1 | 6/2009 | Cutler et al. | |
| 2009/0218711 A1 * | 9/2009 | Dasher | C04B 35/195 |
| | | | 264/43 |
| 2010/0029462 A1 * | 2/2010 | DeRosa | C04B 35/6365 |
| | | | 501/80 |
| 2010/0117272 A1 * | 5/2010 | DeRosa | C04B 35/478 |
| | | | 264/631 |
| 2011/0262689 A1 * | 10/2011 | Bayer | C04B 38/0006 |
| | | | 501/141 |
| 2012/0263914 A1 | 10/2012 | Cai et al. | |
| 2012/0276324 A1 * | 11/2012 | Bayer | C04B 35/622 |
| | | | 428/116 |
| 2017/0044066 A1 | 2/2017 | Bubb et al. | |

\* cited by examiner

CERAMIC ARTICLES WITH BLEED-THROUGH BARRIER AND METHODS OF MANUFACTURE THEREOF

CROSS-REFERENCE TO RELATED APPLICATIONS

This application is a National Stage application under 35 U.S.C. § 371 of International Application No. PCT/US2018/063287 filed on Nov. 30, 2018 which claims the benefit of priority under 35 U.S.C. § 119 of U.S. Provisional Application No. 62/592,579, filed Nov. 30, 2017, the contents of which are relied upon and incorporated herein by reference in their entireties.

FIELD

The following description relates generally to methods for limiting bleed-through of aqueous catalyst solutions in ceramic articles, and to ceramic articles with skins that limit bleed-through of aqueous catalyst solutions.

BACKGROUND

Ceramic honeycomb bodies are used in the motor vehicle industry in filter and catalytic converter applications. Typically, in a catalytic converter application, the ceramic honeycomb bodies are used as substrates that support a catalyst. The catalyst facilitates the reduction of pollutants as engine exhaust flows through the honeycomb body. The catalyst can be applied to a honeycomb body using an aqueous catalyst solution. In some cases, the aqueous catalyst solution diffuses through a portion of the honeycomb body and becomes visible as a stain.

SUMMARY

Illustrative embodiments of the present disclosure are directed to ceramic articles with bleed-through barriers and methods of manufacture, including a method for limiting bleed-through of aqueous catalyst solution in a fired ceramic article comprising applying a hydrophobic cellulose derivative to an exterior surface of an outermost peripheral skin of the fired ceramic article.

In some embodiments, the applying the hydrophobic cellulose derivative to the exterior surface creates a non-wettable surface condition on the exterior surface.

In some embodiments, the hydrophobic cellulose derivative comprises ethylcellulose.

In some embodiments, the hydrophobic cellulose derivative comprises at least one of ethylcellulose, cellulose acetate butyrate, cellulose acetate, and propionate cellulose acetate.

In some embodiments, the fired porous ceramic article comprises a porous ceramic honeycomb body that comprises: (i) a network of walls that defines a plurality of cells, wherein the network of walls extend in an axial direction about or with respect to a longitudinal axis from an inlet end to an outlet end of the porous ceramic honeycomb body; and (ii) an outermost peripheral skin that extends perimetrically around the network of walls and extends between the inlet end and the outlet end; and wherein the outermost peripheral skin comprises the exterior surface.

In some embodiments, an amount of the hydrophobic cellulose derivative within and on the outermost peripheral skin per unit area of the exterior surface comprises at least 1.0 mg/cm$^2$.

In some embodiments, an amount of the hydrophobic cellulose derivative within and on the outermost peripheral skin comprises no greater than 2.0% by weight of a total weight of the fired porous ceramic article.

In some embodiments, the hydrophobic cellulose derivative is applied to the exterior surface of the ceramic article using at least one of spray deposition, brush deposition, roller coating, screen printing, and dip coating.

In some embodiments, applying the hydrophobic cellulose derivative to the exterior surface of the fired ceramic article comprises applying a coating composition to the exterior surface of the fired ceramic article and the coating composition comprises the hydrophobic cellulose derivative and a volatile solvent.

In some embodiments, the volatile solvent comprises at least one of ethyl lactate, butyl lactate, merystyl lactate, and alcohol.

In some embodiments, the volatile solvent comprises ethyl lactate.

In some embodiments, the hydrophobic cellulose derivative comprises between 0.1 and 15.0% by weight of the coating composition.

In some embodiments, the method further comprises, after applying the hydrophobic cellulose derivative, heating the exterior surface of the ceramic article.

In some embodiments, the heating is performed for a period of between 10 minutes to 3 hours.

In some embodiments, the method further comprises, after heating the exterior surface of the ceramic article, applying a data carrying mark to the exterior surface of the ceramic article.

In some embodiments, the heating is performed at a temperature of between 20° C. and 200° C.

In some embodiments, applying the data carrying mark to the exterior surface of the ceramic article comprises: (i) applying a primer coating to at least a portion of the exterior surface of the ceramic article; and (ii) printing the data carrying mark on the portion of the exterior surface where the primer coating is applied.

In some embodiments, the data carrying mark comprises a bar code.

In some embodiments, the method further comprises, after heating the exterior surface of the ceramic article, applying an aqueous catalyst solution to the ceramic article.

Various embodiments of the present disclosure are also directed to a ceramic article comprising a fired porous ceramic honeycomb body that comprises an outermost peripheral skin, wherein the outermost peripheral skin comprises a hydrophobic cellulose derivative.

In some embodiments, the outermost peripheral skin comprises an exterior surface with a non-wettable surface condition.

In some embodiments, the hydrophobic cellulose derivative comprises ethylcellulose.

In some embodiments, the hydrophobic cellulose derivative comprises at least one of ethylcellulose, cellulose acetate, cellulose acetate butyrate, and propionate cellulose acetate.

In some embodiments, an amount of the hydrophobic cellulose derivative within and on the outermost peripheral skin per unit area of an exterior surface of the outermost peripheral skin comprises at least 1.0 mg/cm$^2$.

In some embodiments, an amount of the hydrophobic cellulose derivative within and on the outermost peripheral skin comprises no greater than 2.0% by weight of a total weight of the fired porous ceramic honeycomb body.

In some embodiments, (i) the fired porous ceramic honeycomb body comprises a network of walls that define cells, (ii) the network of walls extends in an axial direction about or with respect to a longitudinal axis from an inlet end to an outlet end of the fired porous ceramic honeycomb body, and (ii) the outermost peripheral skin extends around the network of walls and extends between the inlet end and the outlet end.

In some embodiments, the fired porous ceramic honeycomb body comprises a data carrying mark on the outermost peripheral skin.

Illustrative embodiments are also directed to a method for preparing a fired porous ceramic article for application of aqueous catalytic solution comprising applying a hydrophobic cellulose derivative to at least a portion of an exterior surface of the fired porous ceramic article.

Illustrative embodiments are further directed to a method of wash coating a porous ceramic article comprising an exterior surface. The method comprising: applying a hydrophobic cellulose derivative to at least a treated portion of the exterior surface of the porous ceramic article; heating the ceramic article for a time and at a temperature sufficient to at least partially dry the treated portion, wherein the treated portion is non-wettable; applying an aqueous catalyst solution comprising catalyst material to the porous ceramic article and contacting the treated portion with the aqueous catalyst solution; and heating the ceramic article for a time and at a temperature sufficient to calcine catalyst material and to bond the catalyst material to an untreated portion of the porous ceramic article.

In some embodiments, after calcining the catalyst material, the treated portion of the porous ceramic article is free of catalyst material.

In some embodiments, during calcining the catalyst material, the heating causes removal of the hydrophobic cellulose derivative from the treated portion.

Various embodiments of the present disclosure are also directed to a ceramic article comprising a porous ceramic body comprising a hydrophobic cellulose derivative disposed in or on a treated portion of an exterior surface of the porous ceramic body.

In some embodiments, the ceramic article further comprises a catalyst material disposed in or on the porous ceramic body, wherein the treated portion is free of the catalyst material.

In some embodiments, the ceramic article further comprises a data carrying mark disposed in or on the exterior surface of the honeycomb body.

In some embodiments, the ceramic article further comprises a data carrying mark disposed in or on the treated portion of the honeycomb body.

In some embodiments, the treated portion is disposed on an outermost peripheral skin of the honeycomb body.

BRIEF DESCRIPTION OF THE DRAWINGS

The above and other features, aspects and advantages of the present disclosure are better understood when the following detailed description of the disclosure is read with reference to the accompanying drawings, in which.

DETAILED DESCRIPTION

Illustrative embodiments of the present disclosure are directed to methods for limiting bleed-through of aqueous catalyst solutions in ceramic articles. The method comprises applying a hydrophobic cellulose derivative, such as ethylcellulose, to an exterior surface of a fired ceramic article. When an aqueous catalyst solution is applied to the fired ceramic article, the hydrophobic cellulose derivative limits bleed-through of the aqueous catalyst solution through at least a portion of the ceramic article. Various embodiments are also directed to ceramic articles comprising skins with barriers that limit bleed-through of aqueous catalyst solutions. Details of various embodiments are discussed below.

Figure 1:
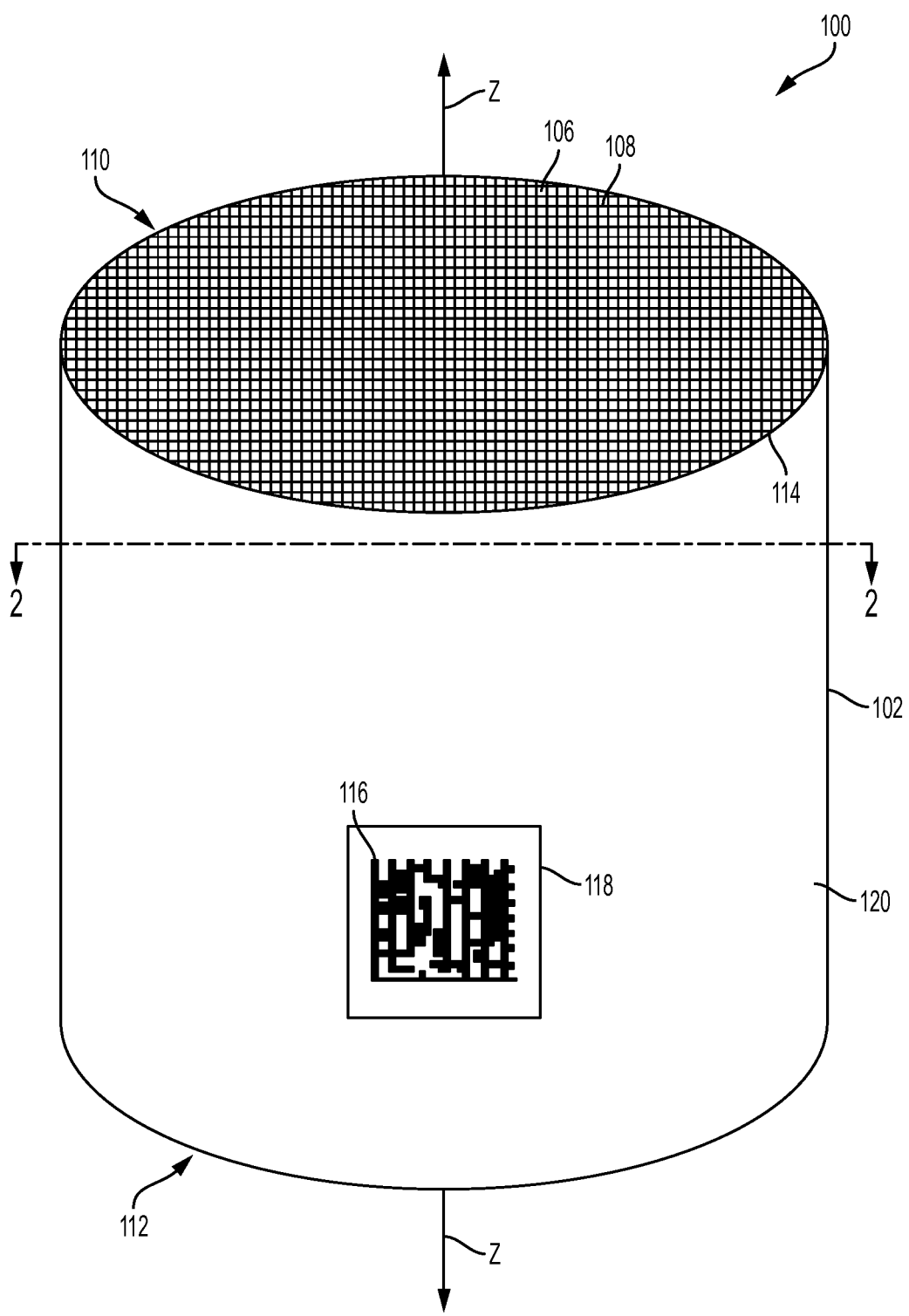
FIG. 1 is a perspective view showing a ceramic article in accordance with one embodiment of the present disclosure.
Figure 2:
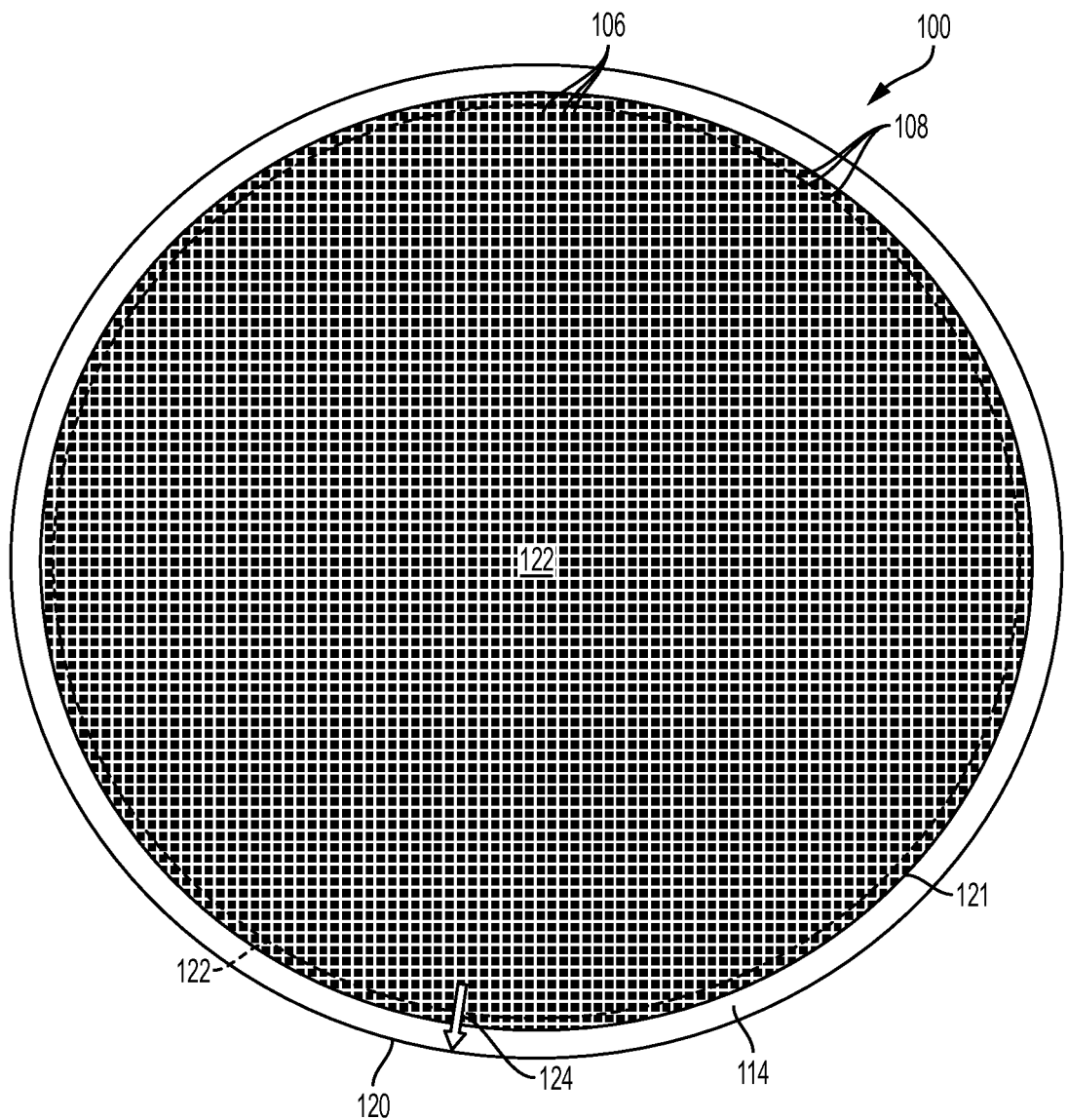
FIG. 2 is a schematic cross-sectional view showing the ceramic article along line 2-2 of FIG. 1.

FIG. 1 is a perspective view showing a ceramic article 100 that can be used as a substrate to support a catalyst material. FIG. 2 is a schematic cross-sectional view showing the honeycomb body along line 2-2 of FIG. 1. The porous ceramic article 100 comprises a porous ceramic honeycomb body 102 with a network of walls 108 that define a number of cells 106. The walls 108 extend in an axial direction about or with respect to a longitudinal axis (z-axis) from an inlet end 110 to an outlet end 112 of the porous ceramic honeycomb body. The honeycomb body 102 also comprises an outermost peripheral skin 114 that extends between the inlet end 110 and the outlet end 112.

The porous honeycomb body 102 is not limited to any particular shape or geometry. As shown in FIG. 2, the porous honeycomb body 102 comprises a circular shape with square cells 106 (as viewed in a transverse plane perpendicular to the longitudinal axis of the honeycomb body (z-axis)). However, the honeycomb body 102 may also have an elliptical or polygonal (e.g., triangular or square) shape, and the cells 106 may have circular, elliptical, or polygonal (e.g., triangular, square, rectangular, hexagonal, and octagonal) shapes.

Also, the porous honeycomb body 102 is not limited to any particular structural characteristics. The porous ceramic article can have a number of different cell densities so that a larger or smaller number of cells 106 can be provided per unit area as viewed in a transverse plane perpendicular to the longitudinal axis of the honeycomb body. For instance, the cell density may range from 10 cells/in$^2$ (1.5 cells/cm$^2$) to 1200 cells/in$^2$ (180 cells/cm$^2$), such as 300 cells/in$^2$ (45 cells/cm$^2$) to 900 cells/in$^2$ (135 cells/cm). The wall thickness of the honeycomb body 102 may range from 0.025 to 1.5 mm (1 to 60 mils), and such as from 0.1 to 0.75 mm (4 to 30 mils) or 0.05 mm to 0.25 mm (2 to 10 mils). The wall median pore size of the honeycomb body 102 may range between about 0.1 to 100 micrometers and, preferably between about 1 to 40 micrometers. The wall porosity of the porous honeycomb body may range between about 15% to about 70%, and more specifically between about 25% to about 50% or between about 55% to about 70%.

The porous honeycomb body 104 comprises a ceramic material, such as cordierite, (ii) aluminum titanate, (iii) silicon carbide, or (iv) combinations thereof. In some embodiments, the ceramic material is a composite material, such as a cordierite and aluminum titanate composite material. In various embodiments, the porous ceramic body predominantly comprises cordierite (e.g., greater than 50%, 60%, 70%, 80%, or 90% by weight of the porous honeycomb body is cordierite).

In some embodiments, the ceramic article 100 comprises a data carrying mark 116 in or on the outermost peripheral skin 114 of the ceramic article 100. The data carrying mark 116 may be applied to a primer coating 118 on an exterior surface 120 of the outermost peripheral skin 114. The data carrying mark 116 may be an alphanumeric mark, such as one or more numbers or letters, and/or a bar code, such as a two-dimensional data matrix barcode. The data carrying mark 116 may comprise a unique individual identification number or code for the ceramic article 100 and/or specific manufacturing information for the article, such as information about (i) the specific factory and/or kiln that produced the ceramic article, (ii) the particular batch for the ceramic, and/or (iii) the date of production.

In various embodiments, the ceramic article 100 can be used as a substrate to support a catalyst material that facilitates the reduction of pollutants as engine exhaust flows through the honeycomb body. The catalyst material may be an oxidation catalyst that converts carbon monoxide into carbon dioxide and/or a reduction catalyst that converts oxides of nitrogen into nitrogen and oxygen. Catalyst materials comprise metals, such as platinum, palladium, and rhodium. The catalyst materials can be disposed within the pores of the walls 108 and on the surfaces of the walls of the porous honeycomb body 102. In some embodiments, the catalyst material is dispersed within an aqueous catalyst solution (also referred to as a "catalyst washcoat") and the solution is applied to an interior volume 122 of the honeycomb body 102. The interior volume 122 of the honeycomb body 102 is defined by an interior surface 121 of the outermost peripheral skin 114 and end faces at the inlet end 110 and the outlet end 112 of the body 102. In this manner, the catalyst material is deposited within the pores of the walls 108 and/or on the surfaces of the walls of the porous honeycomb body 102.

In some cases, the aqueous catalyst solution diffuses from the interior volume 122 of the honeycomb body 122 and through the outermost peripheral skin 114 to the exterior surface 120, as shown by arrow 124 in FIG. 2, This diffusion of aqueous catalyst solution is also referred to as "bleed-through." Bleed-through can occur during (i) application of the aqueous catalyst solution to the ceramic article, (ii) drying of the ceramic article, and/or (iii) calcining of the aqueous catalyst solution. There are several potential disadvantages associated with bleed-through of the aqueous catalyst solution. The first is that the aqueous catalyst solution may create a stain on the exterior surface 120 of the skin 114. The stain may adversely affect the aesthetics of the finished ceramic article and could also distort any data carrying mark 116 that has been applied to the exterior surface 120 of the outermost peripheral skin 114. Secondly, bleed-through may require cleaning aqueous catalyst solution from the exterior surface 120 of the skin 114 and/or from a surrounding environment. Thirdly, bleed-through may make it more difficult to evaluate the amount of catalyst that has been applied to the interior volume 122 of the ceramic article 100. The amount of catalyst material applied to the interior volume 122 is determined by weighing the article (i) before application of the aqueous catalyst solution and (ii) after application of the aqueous catalyst solution and drying and calcining the aqueous catalyst solution. If some of the aqueous catalyst solution escapes from the interior volume 122 of the ceramic article 100 and into the outermost peripheral skin 114, then an accurate measure of catalyst material within the interior volume of the ceramic article may not be determined.

In various embodiments, to limit bleed-through of aqueous catalyst solution, the outermost peripheral skin 114 of the ceramic article 100 comprises a hydrophobic cellulose derivative. This hydrophobic cellulose derivative functions as a barrier to limit bleed-through of aqueous catalyst solution from the interior volume 122 of porous ceramic body 102 through the outermost peripheral skin 114. In some embodiments, the hydrophobic cellulose derivative limits bleed-through of aqueous catalyst solution by completely preventing the bleed-through of aqueous catalyst solution to the exterior surface 120 of the honeycomb body 102. In other embodiments, the hydrophobic cellulose derivative limits bleed-through of aqueous catalyst solution by reducing the amount of bleed-through of aqueous catalyst solution to the exterior surface 120 (as compared to a honeycomb body without any hydrophobic cellulose derivative applied to its outermost peripheral skin).

Also, in some embodiments, another advantage associated with the hydrophobic cellulose derivative is that the hydrophobic cellulose derivative does not disperse into the aqueous catalyst solution and significantly affect the viscosity of the solution because the hydrophobic cellulose derivative is insoluble in water.

The hydrophobic cellulose derivative may comprise any cellulose derivative that is both hydrophobic and insoluble in water. For example, the hydrophobic cellulose derivative may be any alkyl cellulose that is not soluble in water, such as ethylcellulose, or any cellulose ester that is not soluble in water, such as cellulose acetate, cellulose acetate butyrate, and/or propionate cellulose acetate. Cellulose derivatives that are soluble in water, such as methylcellulose, are not hydrophobic cellulose derivatives. The use of ethylcellulose as the hydrophobic cellulose derivative in some embodiments is advantageous because of physical properties that facilitate its use in coating applications, such as high flexibility, thermoplasticity, mechanical strength, film forming ability, toughness, and transparency. Furthermore, the thermo-oxidation of ethylcellulose does not release toxic compounds. The thermo-oxidation of ethylcellulose leads to elimination of an ethoxyl group, which primarily results in ethanol, water, carbon dioxide, and carbon monoxide release.

Figure 3:
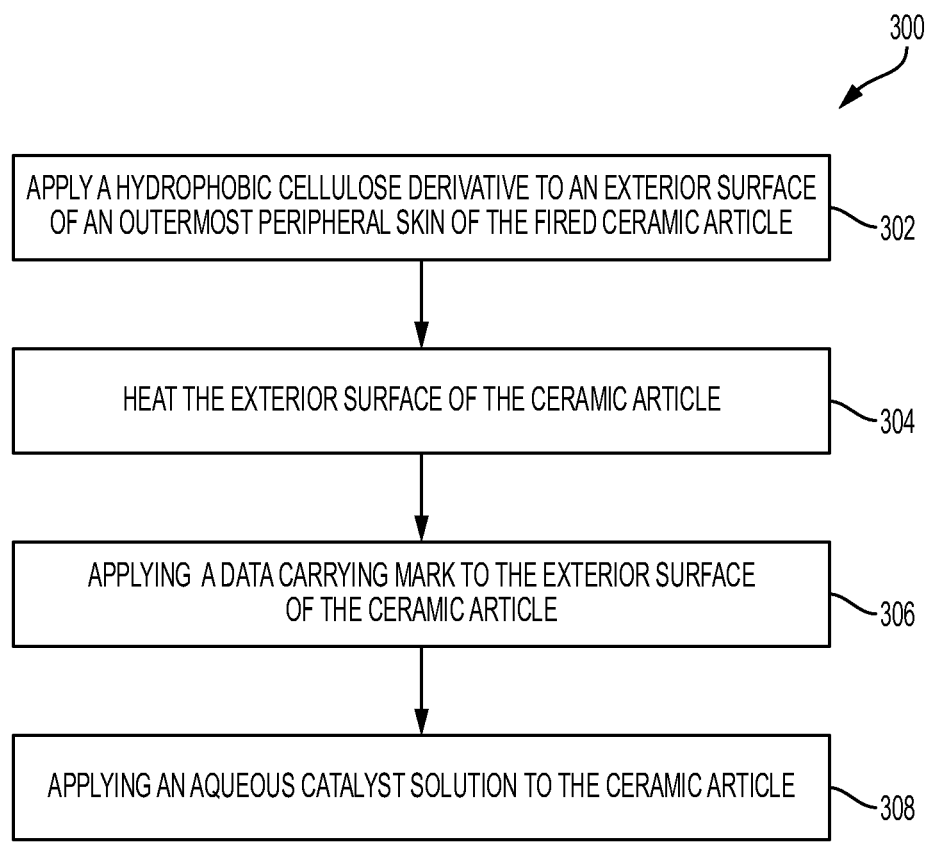
FIG. 3 schematically depicts a method for limiting bleed-through of aqueous catalyst solution in a fired porous ceramic article in accordance with one embodiment of the present disclosure.

FIG. 3 shows a method 300 for limiting bleed-through of aqueous catalyst solution in a fired ceramic article. A fired porous ceramic article, such as the one shown in FIGS. 1 and 2, can be made by extruding a precursor ceramic material to form a green honeycomb structure. This green honeycomb structure is then dried and fired at high temperature to form a porous ceramic honeycomb structure. In some embodiments, an outermost peripheral skin 114 is co-extruded with the network of cells 106 and fired together, in other embodiments, an outermost peripheral skin 114 is applied to the network of cells 106 after the network has been extruded and fired. Such an "after-applied skin" can be set at low temperatures (e.g., temperatures less that 300° C., 250° C., 200° C., 150° C., 100° C., and 50° C.) or can be set by firing the ceramic article at high temperatures.

At process 302 of FIG. 3, a hydrophobic cellulose derivative is applied to at least a portion of the exterior surface 120 of the fired porous ceramic article 100 to prepare the fired porous ceramic article for application of an aqueous catalyst solution. The portions of the exterior surface and the outer peripheral skin where coating composition has been applied are referred to herein as "treated portions." In contrast, the portions of the exterior surface and the outer peripheral skin where coating composition has not been applied are referred to herein as "untreated portions." In some embodiments, the hydrophobic cellulose derivative is applied to the ceramic article 100 as part of a liquid coating composition. In other words, a coating composition comprising the hydrophobic cellulose derivative is applied to the ceramic article 100. In some embodiments, the amount of hydrophobic cellulose derivative present in the coating composition may be between 0.1 to 15.0% by weight of the total weight of the composition. Furthermore, the hydrophobic cellulose derivative can be present within the coating composition in different forms. In some embodiment, the hydrophobic cellulose derivative is dispersed in water as an emulsion. In other embodiments, the hydrophobic cellulose derivative is soluble in a solvent mixture.

In one embodiment, the coating composition comprises the hydrophobic cellulose derivative, such as ethylcellulose, and at least one volatile solvent that can dissolve the hydrophobic cellulose derivative. The solvent may comprise ethyl lactate, butyl lactate, merystyl lactate, $C_1$ (e.g., methanol), $C_2$ (e.g., ethanol), $C_3$, or $C_4$ alcohols, and/or mixtures thereof. The use of ethyl lactate as a solvent in the coating composition is advantageous because it is a more environmentally benign solvent with effectiveness comparable to petroleum-based solvents. Among other advantages. (i) ethyl lactate is completely biodegradable, (ii) ethyl lactate has been approved by the Food and Drug Administration as a non-carcinogenic flavor additive, (iii) ethyl lactate is easy and inexpensive to recycle, and (iv) ethyl lactate is not an ozone depleting chemical and not a hazardous air pollutant.

In various embodiments, the coating composition comprising the hydrophobic cellulose derivative is applied to the treated portion of the exterior surface 120 of the ceramic article 100 using at least one of spray deposition, brush deposition, roller coating, screen printing, and dip coating (e.g., rotational dip coating).

In some embodiments, the ceramic article 100 can be rotated while the coating composition is applied. The application technique may depend on the viscosity of the coating composition. For example, spray deposition is suitable for lower viscosity coating compositions, whereas higher viscosity coating compositions can be applied using brush deposition.

Figure 4:
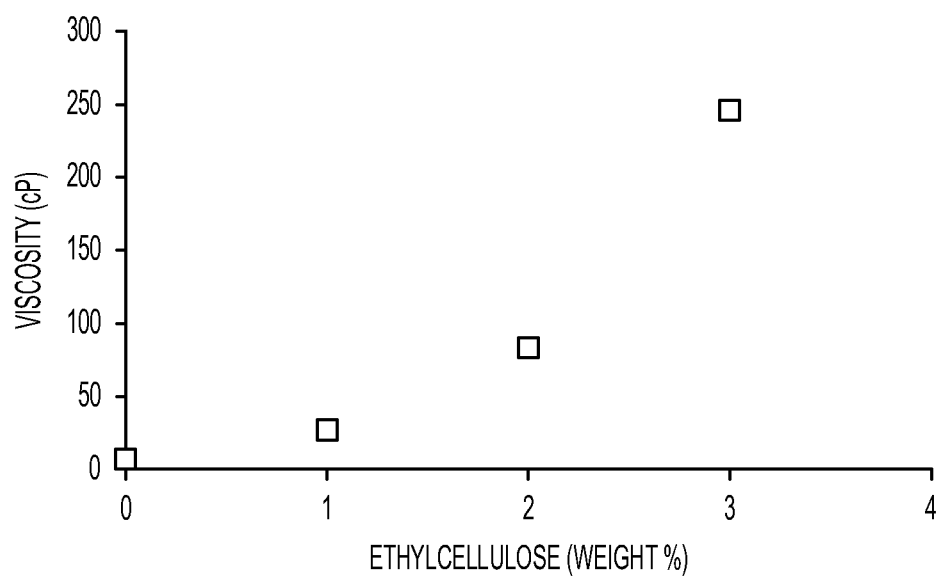
FIG. 4 shows a plot of viscosity versus concentration of ethylcellulose in weight percent for a coating composition comprising ethylcellulose and ethyl lactate.

In some embodiments, the coating composition diffuses all the way through the depth of the skin 114 to the interior surface 121 of the skin, thereby limiting aqueous catalyst solution from diffusing into the skin 114 from the interior volume 122. On the other hand, it is preferable that the coating composition does not diffuse all the way through the skin 114 and into the network of walls 108 of the ceramic article 100. A disadvantage associated with allowing the coating composition to diffuse into the network of walls 108 is that the presence of a hydrophobic coating within the network of walls may result in a loss of surface area for the catalyst particles to bind and, thus, reduce yield decomposition of exhaust gas during a catalyst process. The depth of diffusion of the coating composition into the skin can be controlled by selecting an appropriate rheology (e.g., viscosity) for the coating composition and/or an appropriate amount of coating composition applied to the skin 114. For example, FIG. 4 shows how viscosity of a solution comprising ethyl lactate and ethylcellulose varies with amount of ethylcellulose. The viscosity of the coating composition can also be modified by using a co-solvent, such as isopropanol. An increase in viscosity for the coating composition will correspond to less and shallower diffusion of the coating composition into the skin, while a decrease in viscosity for the coating composition will correspond to more and deeper diffusion of the coating composition into the skin.

After applying the hydrophobic cellulose derivative, in process 304 of FIG. 3, the treated portion of the exterior surface 120 of the ceramic article 100 is heated for a time and at a temperature sufficient to at least partially dry the treated portion. During the heating, the solvent within the coating composition is at least partially evaporated and removed. After heating, in various embodiments, the hydrophobic cellulose derivative is strongly bound to the outermost peripheral skin and is not easily removed after contact with or manipulation of the skin. The ethylcellulose is physically attached to the outermost peripheral skin through a mechanical bond. As solvent evaporates from the coating composition, an ethylcellulose layer (e.g., film) forms and this layer becomes entangled on the rough surface and/or within the pores of the outermost peripheral skin.

The heating process can be performed using hot air drying, such as stationary hot air drying. In some embodiments, the drying is performed for a period of between 10 minutes to 3 hours. Also, in some embodiments, the drying is performed at a temperature of between 20° C. and 200° C., and more specifically between 50° C. and 120° C.

After the heating process, the hydrophobic cellulose derivative forms a layer on and within the outermost peripheral skin 114. In various embodiments, some or all of the hydrophobic cellulose derivative diffuses into the pores within the outermost peripheral skin 114 and is deposited within pores of the outermost peripheral skin. In some embodiments, a portion of the hydrophobic cellulose derivative layer forms on the exterior surface 120 of the outermost peripheral skin 114 and extends above the exterior surface, while another portion of the layer is disposed within the pores of the outermost peripheral skin 114 adjacent to the exterior surface 120.

The amount of hydrophobic cellulose derivative applied to the outermost peripheral skin 114 may vary. In one example, at a minimum, the amount of the hydrophobic cellulose derivative within and on the outermost peripheral skin is sufficient to create a non-wettable surface condition on the exterior surface 120 of the ceramic article 100, wherein an aqueous liquid (e.g., an aqueous catalyst solution) "beads up" on the exterior surface 120 of the ceramic article 100. The non-wettable surface condition is characterized in terms of a contact angle, which is defined as an angle formed at an interface between a liquid and a surface when a liquid droplet is placed on the surface. A non-wettable surface is considered to be a surface where a water droplet applied to that surface exhibits a contact angle greater than about 50°. Low values of contact angle (less than 50°) indicate that the liquid spreads well, with a zero contact angle representing complete wetting. Further details about creating non-wettable surfaces are provided in U.S. Pat. No. 8,518,857, issued on Aug. 27, 2013, which is hereby incorporated herein in its entirety.

In various embodiments, to achieve a non-wettable surface condition, the amount of the hydrophobic cellulose derivative within and on treated portions of the outermost peripheral skin per unit area of the exterior surface comprises at least 0.7 mg/cm$^2$, such as at least 1.0 mg/cm$^2$, at least 1.5 mg/cm$^2$, at least 2.0 mg/cm$^2$, at least 3.0 mg/cm$^2$, at least 4.0 mg/cm$^2$, and at least 5.0 mg/cm$^2$. In some embodiments, to achieve a non-wettable surface condition, the concentration of the hydrophobic cellulose derivative within and on treated portions of the outermost peripheral skin per unit volume of the outermost peripheral skin comprises at least 0.07 mg/cm$^3$, such as at least 0.10 mg/cm$^3$, at least 0.15 mg/cm$^3$, at least 0.2 mg/cm$^3$, at least 0.3 mg/cm$^2$, at least 0.4 mg/cm$^3$, and at least 0.5 mg/cm$^3$.

In another example, at a maximum, the amount of the hydrophobic cellulose derivative within and on the outermost peripheral skin is low enough such that the total weight of the hydrophobic cellulose derivative is negligible compared to the weight of catalyst material deposited in the ceramic article. As explained above, the amount of catalyst material applied to the interior volume 122 of the ceramic article 102 is determined by weighing the article (i) before application of the aqueous catalyst solution and (ii) after application of the aqueous catalyst solution and drying and calcining the aqueous catalyst solution. During the calcining process, at least a portion (if not all) of the hydrophobic cellulose derivative within and on the outermost peripheral skin is removed (e.g., by burning off the hydrophobic cellulose derivative). If the amount of the hydrophobic cellulose derivative within and on the outermost peripheral skin is not negligible, then the measurement of catalyst material within the ceramic article may be undervalued based on the weight of the hydrophobic cellulose derivative that was removed during the calcining process. In various embodiments, a negligible amount of the hydrophobic cellulose derivative within and on the outermost peripheral skin comprises no greater than 2.0% by weight of a total weight of the fired porous ceramic honeycomb body, such as no greater than 1.0% by weight, no greater than 0.5% by weight, or no greater than 0.25% by weight. The total weight of the fired porous ceramic honeycomb body is determined before application of the coating composition.

After heating the exterior surface of the ceramic article, at process 306, a data carrying mark 116 can optionally be applied to the exterior surface 120 of the ceramic article 100. As explained above, the data carrying mark 116 may be an alphanumeric mark, such as one or more numbers or letters, and/or a bar code, such as a two-dimensional data matrix barcode. Process 306 can comprise first applying a primer coating 118 to at least a portion of the exterior surface 120 of the ceramic article 100 and then printing the data carrying mark 118 on the portion of the exterior surface where the primer coating is applied. The data carrying mark 116 can be applied to the exterior surface 120 using an inkjet or laser printing method.

After heating the exterior surface of the porous ceramic article, in process 308, an aqueous catalyst solution is applied to the ceramic article and contacts the untreated and treated portions of the ceramic article. The aqueous catalyst solution deposits catalyst material within the pores of the walls 108 and/or on the surfaces of the walls of the untreated portions of the porous honeycomb body 102, while the hydrophobic cellulose derivative functions as a barrier to limit diffusion of the aqueous catalyst solution into the treated portions of honeycomb body and the outermost peripheral skin.

After applying the aqueous catalyst solution to the porous ceramic article 100, the ceramic article is exposed to a drying condition so that at least a portion of the aqueous component of the solution evaporates. Then, the porous ceramic article 100 is heated for a time and at a temperature sufficient to calcine catalyst material and to bond the catalyst material to an untreated portion of the porous ceramic article. After calcining the catalyst material, the treated portion of the porous ceramic article is free of catalyst material.

Figure 5:
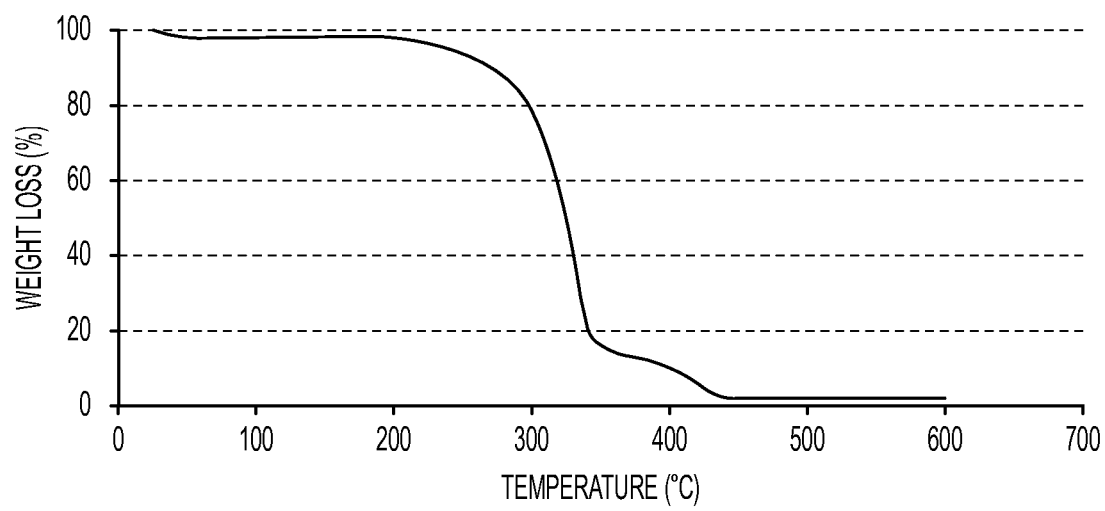
FIG. 5 shows a plot of weight loss in weight percent of ethylcellulose versus calcination temperature.

Another advantage of using ethylcellulose as the hydrophobic cellulose derivative is that, in some embodiments, the ethylcellulose completely degrades (e.g., "burns off") during the calcination process. FIG. 5 shows a thermogravimetric analysis of ethylcellulose degradation. The temperature at which ethylcellulose is completely decomposed (e.g., approximately 450° C.) is lower than the typical calcination temperature applied to ceramic articles (e.g., greater than 500° C.). One benefit of removing the hydrophobic cellulose derivative from the porous honeycomb body 102 and the skin 114 is that the hydrophobic cellulose derivative will not adversely affect the thermo-mechanical properties of the honeycomb body. For example, residual hydrophobic cellulose derivative within the microcracks of the honeycomb body 102 may result in an increase in the coefficient of thermal expansion of the body. Another benefit of removing the hydrophobic cellulose derivative from the porous honeycomb body 102 and the skin 114 is that the hydrophobic cellulose derivative will not interfere with any further processing of the ceramic article.

The disclosure and scope of the appended claims will be further clarified by the following examples.

Example 1

A coating composition as disclosed herein was prepared by dissolving two percent by weight of ethylcellulose (Ethocel Sigma-Aldrich) in ethyl lactate solvent (98% by weight) using magnetic stirring for One hour at room temperature. The resulting coating composition had a viscosity of 81 cP at room temperature. An adhesive was applied to a portion of an outermost peripheral skin of a fired porous cordierite honeycomb article to prevent exposing portion of the outermost peripheral skin to the coating composition. The coating composition was then applied to the outermost peripheral skin of the cordierite honeycomb article using a spray deposition method. The cylindrical honeycomb body of the cordierite honeycomb article was held from both sides and a motor caused the ceramic honeycomb body to rotate at 40 rpm while the coating composition was applied. 35 mg/cm$^2$ of the coating composition was applied to the exterior surface of the skin during the coating application. Then, the cordierite honeycomb article was dried for one hour at 100° C. to remove the ethyl lactate solvent. After drying, the adhesive was removed. An amount of 0.7 mg/cm$^2$ of ethylcellulose was present on or within the portion of the outermost peripheral skin where the coating application was applied.

A low viscosity aqueous solution containing a dark dye red dye) was applied to the cordierite honeycomb article to determine whether the coating composition would limit bleed-through of aqueous catalyst solutions. The viscosity of the low viscosity aqueous solution containing the dark dye was lower than the viscosity of a typical aqueous catalyst solution. The low viscosity aqueous solution was applied to the honeycomb article by submerging one end of the honeycomb article in the aqueous solution. The aqueous solution saturated the walls of the honeycomb article through capillary action. The honeycomb article remained submerged until the walls of the ceramic article were completely saturated with aqueous solution.

Figure 6:
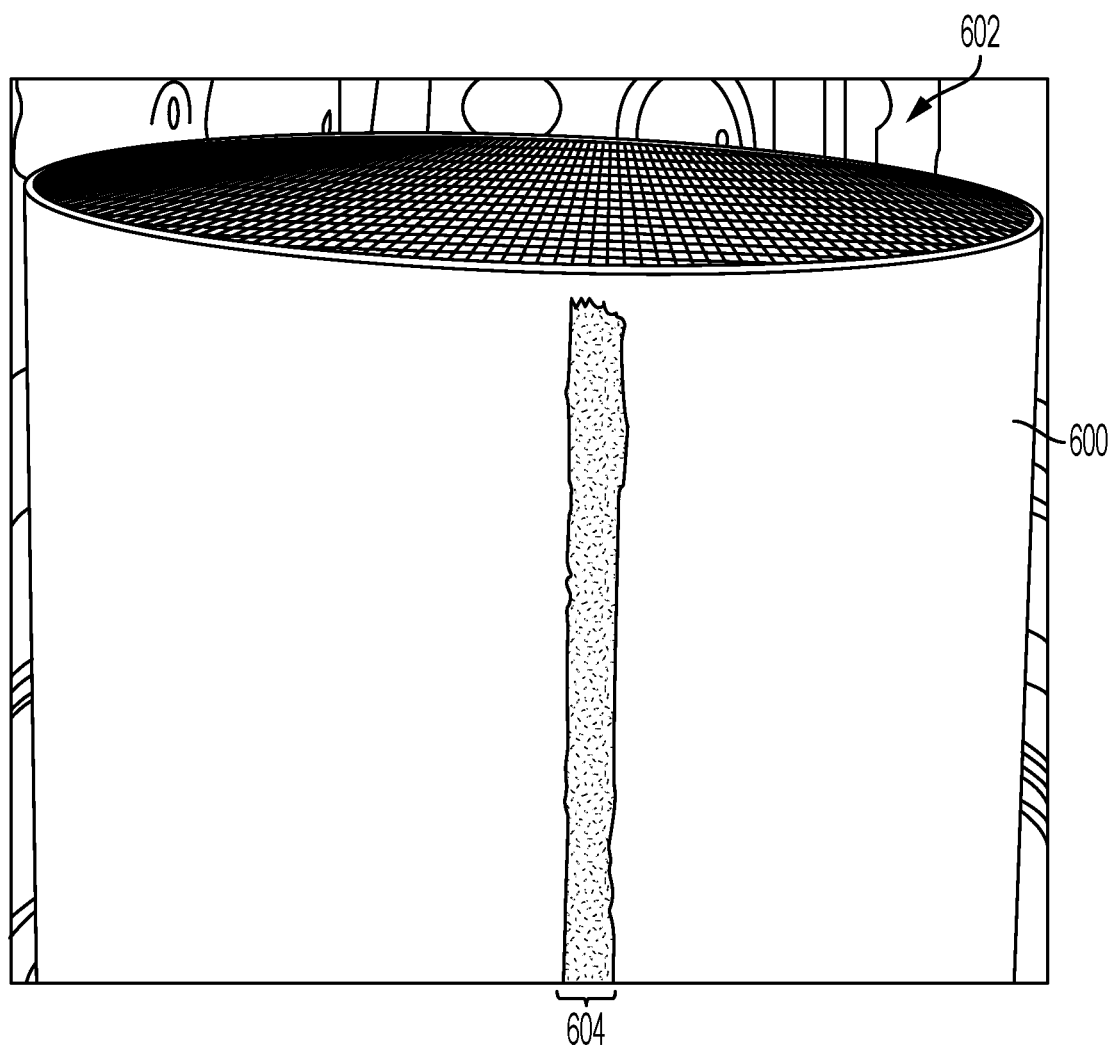
FIG. 6 shows a porous ceramic article with (i) a treated portion of an outermost peripheral skin that was coated with a coating composition as described herein and (ii) an untreated portion of the outermost peripheral skin that remained uncoated with the coating composition.

FIG. 6 shows that a treated portion 600 of the outermost peripheral skin of the honeycomb article 602 that was coated with the coating composition did not have any bleed-through of the aqueous solution and remained light in color. In contrast, the untreated portion of the outermost peripheral skin that was under the adhesive, and was not coated with the coating composition 604, did have bleed-through and that portion of the skin appears dark in color.

Figure 7:
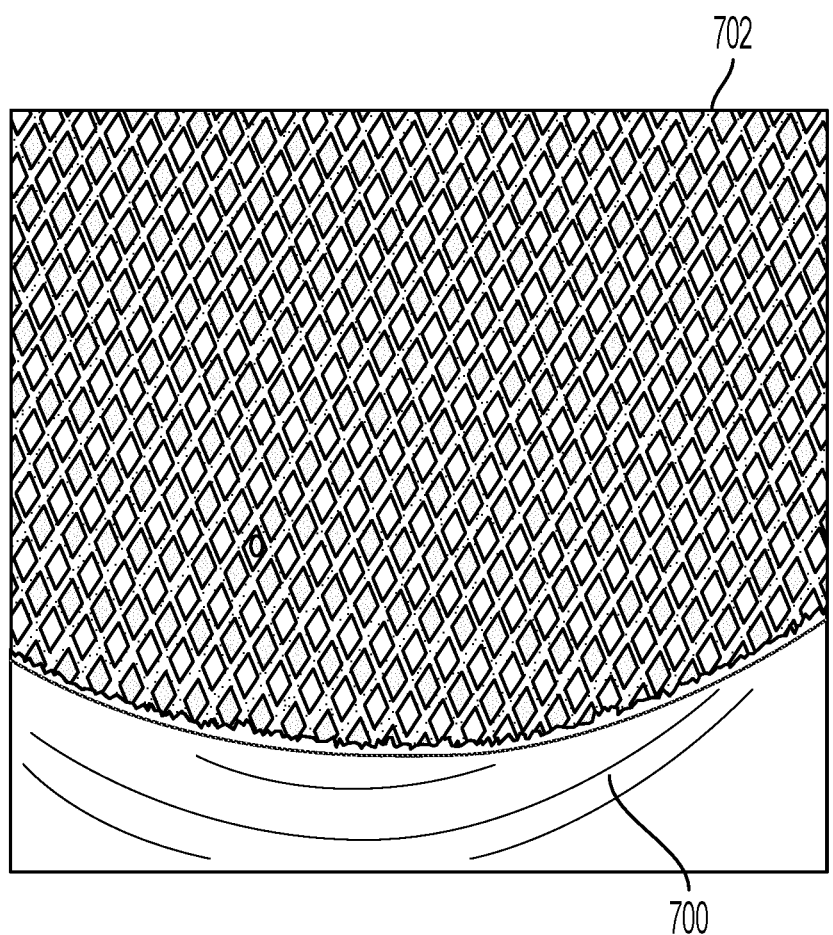
FIG. 7 shows another view of the ceramic article of FIG. 6.

FIG. 7 shows another view of the ceramic article of FIG. 6. In FIG. 7, the network of walls 702 is coated with aqueous solution up to the outermost peripheral skin 700 (untreated portion is dark in color). The contrast between the dark network of walls 702 and the lighter outermost peripheral skin 700 shows that the coating composition was applied only to the outermost peripheral skin and did not penetrate into the network of walls and prevent coating of the network of walls with aqueous solution. It is preferable that the network of walls remains uncoated by the coating composition so that an aqueous catalyst solution can be applied and adhere to the network of walls.

Example 2

A second coating composition as disclosed herein was prepared by dissolving three percent by weight of ethylcellulose (Ethocel Sigma-Aldrich) in a mixture of ethyl lactate and isopropanol using magnetic stirring for one hour at room temperature. The mixture was 97% by weight of the composition. Ethyl lactate and isopropanol were respectively 75% by weight and 25% by weight in the mixture. The resulting coating composition had a viscosity of 200 cP at room temperature. The coating composition was applied to an outermost peripheral skin of a porous ceramic honeycomb article using a brush deposition method. A treated portion of the outermost peripheral skin of the article was saturated with the coating composition, while other untreated portions of the skin remained uncoated. Then, the ceramic honeycomb article was dried for one hour at 100° C., resulting in formation of a transparent film on portions of the exterior surface of the skin. The film formed during the drying process through condensation of the hydroxyl group within the ethylcellulose by a sol-gel process.

An aqueous solution containing a dark dye (a red dye) was applied to the cordierite honeycomb article to determine whether the coating composition would limit bleed-through of aqueous catalyst solutions. The aqueous solution was applied to the cordierite honeycomb article using the method described in Example 1.

Figure 8:
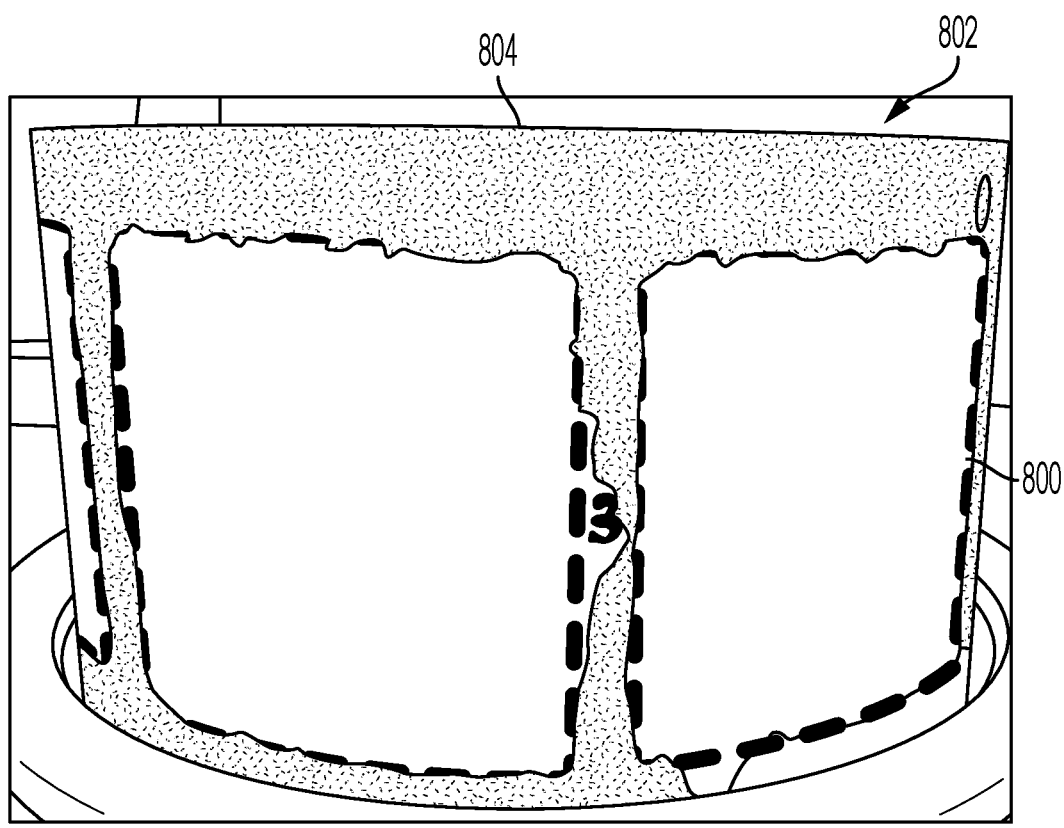
FIG. 8 shows another example of a porous ceramic article with (i) treated portions of an outermost peripheral skin that was coated with a coating composition as described herein and (ii) an untreated portion of the outermost peripheral skin that remained uncoated with the coating composition.

FIG. 8 shows that the treated portions 800 of the outermost peripheral skin of the honeycomb article 802 that were coated with the coating composition did not have any bleed-through of the aqueous solution and remained light in color. In contrast, the untreated portion 804 of the outermost peripheral skin that was not coated with the coating composition 804 did have bleed-through and that portion of the skin appears dark in color.

It will be understood that for the purposes of this disclosure, "at least one of X, Y, and Z" can be construed as X only, Y only, Z only, or any combination of two or more items X, Y, and Z (e.g., XYZ, XYY, YZ, ZZ). Furthermore, it will be understood that for the purposes of this disclosure, "X, Y, and/or Z" can be construed as X only, Y only, Z only, or any combination of two or more items X, Y, and Z (e.g., XYZ, XYY, YZ, ZZ).

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A method for limiting bleed-through of aqueous catalyst solution in a fired porous ceramic article, the aqueous catalyst solution comprising catalyst materials comprising platinum, palladium, rhodium, or combinations thereof, the method comprising:
  applying a hydrophobic cellulose derivative to an exterior surface of a fired porous ceramic article.

2. The method of claim 1, wherein the hydrophobic cellulose derivative comprises ethyl cellulose.

3. The method of claim 1, wherein the hydrophobic cellulose derivative comprises at least one of ethyl cellulose, cellulose acetate butyrate, cellulose acetate, and propionate cellulose acetate.

4. The method of claim 1,
  wherein the fired porous ceramic article comprises:
    a porous ceramic honeycomb body that comprises:
      a network of walls that defines a plurality of cells, wherein the network of walls extends in an axial direction with respect to a longitudinal axis from an inlet end to an outlet end of the porous ceramic honeycomb body; and
      an outermost peripheral skin that extends perimetrically around the network of walls and extends between the inlet end and the outlet end; and
    wherein the outermost peripheral skin comprises the exterior surface.

5. The method of claim 4, wherein an amount of the hydrophobic cellulose derivative within and on the outermost peripheral skin per unit area of the exterior surface comprises at least 0.7 mg/cm$^2$.

6. The method of claim 1, wherein applying the hydrophobic cellulose derivative to the exterior surface of the fired ceramic article comprises applying a coating composition to the exterior surface of the fired ceramic article and the coating composition comprises the hydrophobic cellulose derivative and a volatile solvent.

7. The method of claim 6, wherein the volatile solvent comprises at least one of ethyl lactate, butyl lactate, myristyl lactate, and alcohol.

8. The method of claim 6, wherein the hydrophobic cellulose derivative comprises between 0.1 and 15.0% by weight of the coating composition.

9. The method of claim 1, further comprising:
  after applying the hydrophobic cellulose derivative, heating the exterior surface of the ceramic article.

10. The method of claim 9, further comprising:
  after heating the exterior surface of the ceramic article, applying a data carrying mark to the exterior surface of the ceramic article.

11. The method of claim 9, further comprising:
  after heating the exterior surface of the ceramic article, applying the aqueous catalyst solution to the ceramic article.

12. A ceramic article comprising:
a fired porous ceramic honeycomb body that comprises an outermost peripheral skin, wherein the outermost peripheral skin comprises a hydrophobic cellulose derivative.

13. The ceramic article of claim 12, wherein the hydrophobic cellulose derivative comprises ethyl cellulose.

14. The ceramic article of claim 12, wherein the hydrophobic cellulose derivative comprises at least one of ethyl cellulose, cellulose acetate, cellulose acetate butyrate, and propionate cellulose acetate.

15. The ceramic article of claim 12, wherein an amount of the hydrophobic cellulose derivative within and on the outermost peripheral skin per unit area of an exterior surface of the outermost peripheral skin comprises at least 0.7 mg/cm$^2$.

16. The ceramic article of claim 12, wherein an amount of the hydrophobic cellulose derivative within and on the outermost peripheral skin comprises no greater than 2.0% by weight of a total weight of the fired porous ceramic honeycomb body.

17. The ceramic article of claim 12,
wherein the fired porous ceramic honeycomb body comprises a network of walls that define cells,
wherein the network of walls extends in an axial direction with respect to a longitudinal axis from an inlet end to an outlet end of the fired porous ceramic honeycomb body, and
wherein the outermost peripheral skin extends around the network of walls and extends between the inlet end and the outlet end.

18. The ceramic article of claim 12, wherein the fired porous ceramic honeycomb body comprises a data carrying mark on the outermost peripheral skin.

19. A method of wash coating a porous ceramic article comprising an exterior surface, the method comprising:
applying a hydrophobic cellulose derivative to at least a portion of the exterior surface of the porous ceramic article to create a treated portion of the exterior surface;
heating the ceramic article for a time and at a temperature sufficient to at least partially dry the treated portion, wherein the treated portion is non-wettable;
applying an aqueous catalyst solution comprising catalyst material to the porous ceramic article and contacting the treated portion with the aqueous catalyst solution, the aqueous catalyst solution comprising catalyst material comprising platinum, palladium, rhodium, or combinations thereof; and
heating the ceramic article for a time and at a temperature sufficient to calcine catalyst material and to bond the catalyst material to an untreated portion of the porous ceramic article.

\* \* \* \* \*